Sept. 11, 1945.     H. F. FRUTH ET AL     2,384,542
INORGANIC INSULATION FOR ELECTRICAL CONDUCTORS
Filed July 8, 1942
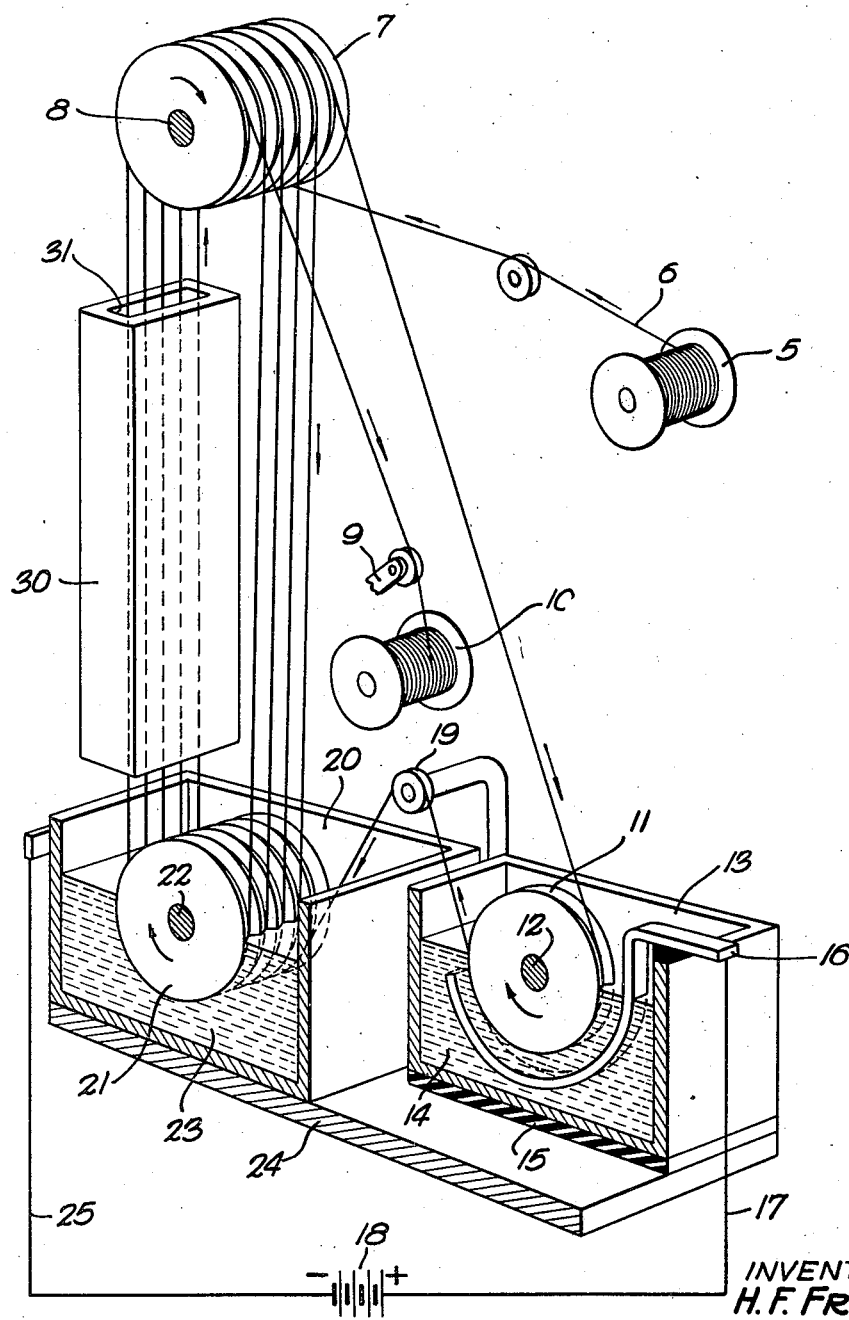
INVENTORS
H. F. FRUTH
W. O. HAAS JR.
E. G. WALTERS
BY
ATTORNEY Patented Sept. 11, 1945

2,384,542

UNITED STATES PATENT OFFICE 2,384,542

INORGANIC INSULATION FOR ELECTRICAL CONDUCTORS

Hal F. Fruth, Elmhurst, Walter O. Haas, Jr., Wilmette, and Ernest G. Walters, Chicago, Ill., assignors to Western Electric Company, Incorporated, New York, N. Y., a corporation of New York Application July 8, 1942, Serial No. 450,148

20 Claims. (Cl. 117—169)

This invention relates to inorganic insulation suitable for insulating electrical conductors and more particularly to conductors insulated therewith. The invention also relates to methods of making inorganic insulating materials and to methods of applying adherent inorganic insulating coatings to wires.

In the past, inorganic insulating compositions including, with other elements, silicates of soda as a binder, have been proposed as insulating media. These compositions have, so far as is known, been heated to fuse the silicate of soda and form a vitreous material. When these compositions were heat treated below the fusion point, the product was highly water absorbent and, therefore, unsuitable as an insulating material. Therefore, insofar as was known prior to the present invention, relatively flexible wires or sheet material could not be coated satisfactorily with compositions including silicates of soda and other inorganic compounds to form an inorganic insulating coating on the articles, since fused silicate of soda is too brittle to withstand flexing and, in the unfused state, it has been too hygroscopic to serve as a satisfactory insulating material.

An object of the present invention is the provision of an inexpensive and effective, inorganic insulating material suitable for insulating electrical conductors.

Another object of the invention is the provision of simple methods of expeditiously coating articles such as electrical conductors with inorganic insulating coatings.

It has been found that when silicate of soda is applied in water solution to a clean conductor and the resulting coating is heated to a temperature and for a period of time sufficient to remove the free water, the end products of this heating operation form an excellent insulation for the conductor. This insulation is substantially non-hygroscopic and is pliable and extremely adherent.

Various types of silicates of soda may be used in practicing this invention. Silicates of soda having a silica to soda ratio higher than 4 to 1 are more difficultly soluble in water from the solid state than those having a lower ratio. Excellent results have been obtained by using a silicate of soda in which the ratio $SiO_2:Na_2O$ is of the approximate value of 4:1, because they are stable in solution and quite soluble in water. When these silicates of soda are applied to a metallic surface from which all impurities, including most of the oxides, have been removed, and baked thereon at relatively high temperatures, the silica may be dehydrated to such an extent that it shows only a very slight affinity for moisture and forms a pliable but glass-like coating on the metal.

Insofar as is known, this characteristic of silicates of soda having the ratios of ingredients set forth hereinbefore was not generally recognized. Those heretofore attempting to discover or devise suitable inorganic insulations for metallic parts had not recognized this characteristic of silicates of soda; namely, that its water solubility may be rendered substantially irreversible by driving off substantially all free water, and this characteristic has been utilized herein. It should be noted that temperatures which apparently are beneath the range which would cause true fusion of the silicate of soda particles are still sufficient to develop this characteristic of the material.

In accordance with one embodiment of the present invention, a copper wire is cathodically cleaned in a bath comprising principally a water solution of a siliceous material, such as a water solution of silicate of soda, having the highest possible silica content commensurate with its water solubility. The wire, after having been cleaned and while still wet with the solution of the cleaning bath, is passed through a second bath of substantially the same material as the cleaning bath to coat the wire with this material. The coated wire is then directed through a dehydrating oven to remove substantially all of the free water. The oven is heated to a relatively high temperature, which may be less than one-half the temperature necessary to fuse the siliceous material, and in passing through the oven, the free water is driven off, leaving a glass-like, yet pliable, coating on the wire, which coating is substantially non-hygroscopic.

A better understanding of the invention may be had by reference to the following detailed description when considered in conjunction with the accompanying drawing, wherein the single figure is a perspective view of an apparatus for applying an inorganic insulating coating to a wire in accordance with the present invention, parts being broken away to illustrate more clearly other portions of the apparatus.

Referring to the drawing, wherein like reference characters designate the same parts throughout the several views, a supply spool 5 is shown having a supply of wire 6 wound thereon to which a coating of insulating material is to be applied. The wire 6 is drawn from the supply spool 5, which may be supported in any suitable manner, and is passed around a grooved capstan 7 mounted on a shaft 8. Any suitable driving means (not shown) may be utilized to drive the shaft 8, a distributor 9, illustrated diagrammatically, and a takeup spool or reel 10, in timed relation.

The wire 6 is directed from the first groove of the capstan 7 to a pulley 11 having a single groove formed therein. A shaft 12, journalled in the side walls of a vessel 13, supports the pulley 11, half of the pulley 11 extending into an electrolytic bath 14 in the vessel 13. The vessel 13 rests on an insulating mounting 15 and has mounted on and insulated from it an anode member 16 connected by means of a lead wire 17 to a current source 18. After the wire 6 has passed through the bath 14, it is directed over a conducting guide roller 19 conductively connected to the framework and positioned between the vessel 13 and a second vessel 20. The wire 6, after passing over the guide roller 19, is directed into one of a plurality of grooves in a cylindrical grooved pulley 21, which is mounted for rotation on a shaft 22, which is, in turn, fixed in the side walls of the vessel 20. Approximately one-half of the pulley 21 is positioned beneath the surface of a bath 23 contained in the vessel 20. The vessel 20 is mounted on a base plate 24, which supports the insulating mounting 15 and the vessel 20 and the entire framework are connected to the negative side of the current source 18 by a lead wire 25.

Positioned above the vessel 20 is a heating chamber or oven 30, having a central passage 31 through which the wire 6 passes in its movement upwardly, the wire being directed from the pulley 21 back to the capstan 7. The wire 6 is passed through the composition 14 once to clean it but may be passed through the bath 23 and oven 30 a number of times dependent upon the thickness of coating of the insulating material which it is desired to apply to the wire.

The preferred form of the material in the bath 14 and bath 23 is a water solution of silicate of soda combined with a wetting agent. Both the electrolytic bath 14 and coating bath 23 may be composed of the same ingredients in identical proportions. A silicate of soda which has been used and which gives a highly satisfactory product is a silicate of soda in which the silica-soda molecular ratio is approximately 4 to 1. A commercial form of silicate of soda which is stable and quite soluble in water and which has the molecular ratio

$SiO_2:Na_2O::3.98:1$ has been used satisfactorily. However, a more siliceous, metastable silicate of soda could be used. These materials, however, are not as stable as the composition $SiO_2:Na_2O::3.98:1$. While it is desirable that the coating applied to the wire have a high silica to soda ratio in order to obtain the maximum water resistance and thus the maximum corrosion resistance in the coating, the empirical formula set forth hereinbefore, that is, $SiO_2:Na_2O::3.98:1$ appears most desirable from the standpoint of cheapness and ease of application.

It has been found that a silicate of soda having the silica-soda ratio $SiO_2:Na_2O::3.98:1$ combined with water in a solution having 7.75% by weight of silicate of soda, 92.24% to 92.15% water and .01% to 0.1% wetting agent, such as the dioctyl ester of a sulfosuccinic acid, sold on the market as "Aerosol-OT," provides a highly suitable coating agent when deposited upon a thoroughly clean copper wire and properly baked on the wire.

This type of silicate of soda probably exists in water solution as an equilibrium of sodium ions, both free and adsorbed on colloidal particles, and silica as crystalloidal silicic acid, colloidal silicic acid and silicate ions, the silicate ions being both free and combined in groups of various complexities, some of which groups contain silicic acid. A more siliceous metastable silicate of soda may be used with satisfactory results and other alkali metal silicates, such as potassium silicate, have properties similar to those of the silicate of soda identified specifically hereinbefore and may be satisfactorily used. The low solubility of silicates of ammonia limit their usefulness but coatings may be made satisfactorily from silica esters such as ethyl orthosilicate in such solvents as a dioxane-water or alcohol-water solution or from certain silica sols.

In order to clean the wire 6 sufficiently to insure proper adherence of the coating bath 23 to it, a cleaning process is used wherein a cleansing bath of the same composition as the coating bath may be utilized and wherein the strand of wire 6 being coated is first run through the cleansing bath to cathodically clean the wire in a silicate of soda solution, as illustrated in the drawing. In the cleaning bath, the wetting agent may be omitted. This cleaning is a combination of scrubbing and electrolytic reduction wherein soap, grease, copper dust and other impurities on the surface of the wire are removed by the deflocculating action of the colloidal silica in the bath and by the evolution of hydrogen at the wire. In this bath, the wire is completely cleaned and the corrosion products (oxides, sulphides, et cetera) are changed to water, soluble sulphate and the like and pure copper.

It has been found desirable to move the copper wire at an optimum speed which depends upon the size of the wire, the current density and other factors involved in the cleaning bath and also the temperature to which the heating oven is heated and the length of the heating oven. It has been found that when a No. 40 copper wire (i. e., 0.003144" in diameter) is advanced through the cleaning bath at the rate of 40 feet per minute and subjected therein to a current of sufficient intensity to provide a cathode current density of 3 amperes per square inch at a potential of 6 volts for approximately one second, the surface of the wire is so clean that the subsequently applied coating will properly adhere to it.

The wire 6 is passed, as illustrated in the drawing, directly from the cleaning bath 14 to the coating bath 23 and in order to prevent the evolution of hydrogen at the surface of the wire upon the application of successive coats to the wire, the negative terminal of the direct current source 18 is connected to the vessel 20 in which the coating bath 23 is contained. As the wire passes from the cleaning bath 14 to the coating bath 23, it will constantly be wet with the composition withdrawn from the cleaning bath on the surface of the wire, but this will not interfere with the coating operation because the cleaning bath is substantially the same as the coating bath. In fact, the cleansing material carried by the wire and the cleansing of the wire will promote the wetting and adherence of the initial coating applied on the wire. It has been found that with No. 40 wire travelling at the rate of 40 feet per minute, an oven approximately 55" long heated to a temperature of from 750 to 850 degrees Fahrenheit will bake the coating composition on the wire by effecting a substantial dehydration of the coating. As a result, a substantially non-hygroscopic coating will be obtained which is glass-like in texture and appearance, but which is highly flexible and adherent. The glass-like coating thus applied to the wire has sodium ions partly in combination with silica and silicate ions and partly strongly adsorbed at the surface of the coating. This coating can be subjected to water without dissolving the coating of silica to an appreciable amount. In fact, the coating, after soaking in water for a week, has been found to have lost practically none of its silica and while the soda left after the baking is partially leached out, the coating still has the desired insulating and mechanical qualities.

While the wetting agent described hereinbefore has been specifically designated as the dioctyl ester of a sulfosuccinic acid, other wetting agents, such as sodium salts of alkyl naphthalene sulfonic acids, and sulphates of fatty alcohols, such as lauryl alcohol, may be used in combination with the silicate of soda in very small percentages to facilitate the wetting action of the silicate of soda and to promote smoothness of the coating on the wire and on previously baked layers of the coating on the wire. The use of the wetting agent will also facilitate the production of heavy coatings with relatively few passes of the strand of wire through the coating bath.

If it is desired, fillers, such as mica, talc or other inorganic materials, may be used in the coating bath and this bath may be agitated to maintain the solids in suspension.

What is claimed is:

1. An article of manufacture comprising a conductor coated with an insulating coating consisting of the end products obtained by heating an aqueous solution of silicate of soda having a high silica to soda ratio, sufficiently to drive off all free water from the coating without fusing the residual coating matter, said heating comprising substantially the equivalent of that obtaining when a coated conductor of No. 40 gage is passed at forty feet per minute through an oven 55 inches long, heated to from 750° F. to 800° F.

2. An article of manufacture comprising a conductor coated with an insulating coating consisting of the unfused end products obtained by heating an aqueous solution of silicate of soda, wherein the silica to soda ratio is above 3.5 to 1, sufficiently to drive off all free water from the coating, said heating comprising the equivalent of that obtaining when a coated conductor of No. 40 gage is passed at forty feet per minute through an oven 55 inches long, heated to approximately 800° F.

3. An article of manufacture comprising a conductor coated with an insulating coating consisting of the unfused end products obtained by heating an aqueous solution of silicate of soda, wherein the silica to soda ratio is 3.98 to 1, sufficiently to drive off all free water from the coating, said heating comprising the equivalent of that obtaining when a coated conductor of No. 40 gage is passed at forty feet per minute through an oven 55 inches long, heated to from 750° F. to 850° F.

4. A method of making an insulated conductor which comprises applying a solution of silicate of soda to a conductor to form a coating thereon, and heating the coating to approximately 800° F. for a period sufficient to drive off substantially all of the solvent and render the coating substantially non-hygroscopic without fusing the residue left on the conductor.

5. A method of forming an insulating coating, which comprises applying an aqueous solution of silicate of soda and a small amount of the dioctyl ester of a sulfosuccinic acid to a surface and heating the coating to drive off substantially all free water, whereby the water solubility of the coating becomes substantially irreversible without fusing the coating material, said heating comprising the equivalent of that obtained by passing a coated conductor of No. 40 gage at 40 feet per minute through an oven 55 inches long heated to approximately 800° F.

6. A method of making an insulated conductor, which comprises applying a solution of silicate of soda containing a small amount of wetting agent to the conductor to form a coating, and heating the coating to approximately 800° F. for a period sufficient to drive off substantially all of the solvent and render the coating substantially non-hygroscopic without fusing the residue left on the conductor.

7. A method of making an insulated conductor which comprises applying a solution of silicate of soda containing a small amount of wetting agent to the conductor to form a coating, and heating the coating for a predetermined period at approximately half the temperature necessary to fuse the silicate of soda to drive off substantially all of the solvent and render the coating substantially non-hygroscopic.

8. A method of making an insulated conductor which comprises applying a solution consisting of silicate of soda having a fusion point above 1,000° F. and a small amount of wetting agent to the conductor to form a coating, and heating the coating to approximately 800 degrees Fahrenheit for a predetermined period of time to drive off substantially all of the solvent and render the coating substantially non-hygroscopic, said time being dependent upon the size of the conductor and the strength of the solution.

9. A method of applying an inorganic insulating coating on a wire, which comprises cathodically cleaning the wire in a bath comprising an aqueous solution of an alkali metal silicate, and applying a coating of said aqueous solution of an alkali metal silicate to the wire.

10. A method of applying an inorganic coating of insulation to a wire, which includes the step of preliminarily cathodically cleaning the wire in a bath including principally silicate of soda combined with a small amount of wetting agent and then coating the wire by passing it through a bath of the same composition as the cleaning bath.

11. A method of applying an inorganic coating of insulation to a wire which includes the step of preliminarily cathodically cleaning the wire in a bath including principally silicate of soda wherein the silica to soda ratio is approximately 4 to 1 and then coating the wire by passing it through a bath of the same composition as the cleaning bath.

12. A method of applying an inorganic coating of insulation on a metallic strand, which comprises cleaning the strand cathodically in an aqueous solution of silicate of soda, passing the strand through a bath of substantially the same composition as the cleaning bath to coat the strand, and removing all free water from the coating by heating the coating to a temperature below the fusion point of the coating.

13. A method of applying an inorganic coating of insulation on a metallic strand, which comprises cleaning the strand cathodically in an aqueous solution of silicate of soda, passing the strand through a bath of the same composition as the cleaning bath, and removing all free water from the coating by heating the coated strand to a predetermined temperature for a predetermined length of time without fusing the residue left on the strand.

14. A method of applying an inorganic coating of insulation on a metallic strand which comprises cleaning the strand cathodically in an aqueous solution of silicate of soda, passing the strand through a bath of the same composition as the cleaning bath, and heating the coating to such a temperature and for such a period as to drive off substantially all of the free water and render the coating substantially non-hygroscopic without fusing the residue left on the strand.

15. A method of applying an inorganic insulating coating on a conductor which comprises cathodically cleaning the conductor in an aqueous solution of an alkali metal silicate, passing the conductor from the cleaning solution into a bath composed of an alkali metal silicate in water to coat it with said solution, and baking said solution on the conductor at a temperature below the fusion point of the solution to remove substantially all free water therefrom.

16. A method of applying an inorganic insulating coating on a conductor comprising cathodically cleaning the conductor in a silicate of soda solution, passing the conductor from the cleaning solution into a bath comprised of a water solution of silicate of soda, said silicate of soda having a silica-soda ratio of approximately 4 to 1, and baking said solution on the conductor to remove substantially all free water therefrom without fusing the residue left on the conductor.

17. A method of applying an inorganic insulating coating on a conductor comprising cathodically cleaning the conductor in a silicate of soda solution, passing the conductor from the cleaning solution into a bath comprised of silicate of soda dissolved in water, said silicate of soda having a silica-soda ratio of approximately 4 to 1, and baking said solution on the conductor at a temperature of approximately 800° F. to render the coating non-hygroscopic.

18. A method of applying an inorganic insulating coating on wire which consists of cleaning the wire to remove all surface impurities therefrom, passing the wire through a bath consisting of approximately 7.75% silicate of soda, 92.24% to 92.15% $H_2O$, and .01% to .1% of a wetting agent by weight, wherein the molecular ratio of silica to soda is 3.98 to 1, to apply a coating of said bath material on the wire, and then passing the wire through a heating chamber to remove substantially all of the free water from the said layer without fusing said layer, the heating chamber being heated to approximately 800° F.

19. An article of manufacture comprising a conductor coated with an insulating coating consisting of the unfused end products of heating an aqueous solution of silicate of soda alone to render the coating non-hygroscopic, said end products being substantially the equivalent of that obtained by passing a conductor of No. 40 gage so coated at forty feet per minute through an oven 55 inches long, heated to from 750° F. to 850° F.

20. The method of insulating conductors, which comprises continuously and sequentially advancing a conductor as a cathode through an electrolytic cleaning bath comprising an aqueous solution of an alkali metal silicate, advancing the thus cleaned conductor through a coating bath of the same composition as the cleaning bath, and advancing the coated conductor through a heated zone which is sufficiently long and sufficiently hot to remove the free water from the coating on the conductor without fusing the residue left on the conductor.

HAL F. FRUTH.
WALTER O. HAAS, Jr.
ERNEST G. WALTERS.